United States Patent [19]

Sung

[11] 4,380,909
[45] Apr. 26, 1983

[54] METHOD AND APPARATUS FOR CO-GENERATION OF ELECTRICAL POWER AND ABSORPTION-TYPE HEAT PUMP AIR CONDITIONING

[75] Inventor: Harry M. Sung, Moraga, Calif.

[73] Assignee: Chevron Research Company, San Francisco, Calif.

[21] Appl. No.: 284,379

[22] Filed: Jul. 17, 1981

[51] Int. Cl.³ ............................................. F25B 7/00
[52] U.S. Cl. ......................................... 62/79; 62/101; 62/238.3; 62/324.2; 62/476
[58] Field of Search ................ 62/79, 101, 238.3, 148, 62/476, 159, 324.4, 160, 324.1, 324.2, 141

[56] References Cited

U.S. PATENT DOCUMENTS

| | | | |
|---|---|---|---|
| 2,212,869 | 8/1940 | Tornquist | 62/101 |
| 2,548,508 | 4/1951 | Wolfner | 62/238.3 |
| 2,932,958 | 4/1960 | Johansson et al. | 62/476 |
| 3,077,083 | 2/1963 | Kubo et al. | 62/238.3 |
| 3,527,060 | 9/1970 | Kruggel | 62/476 |
| 4,178,772 | 12/1979 | Swenson et al. | 62/324.2 |
| 4,253,310 | 3/1981 | Sokolov | 62/79 |
| 4,291,545 | 9/1981 | Worsham | 62/476 |

*Primary Examiner*—Lloyd L. King
*Attorney, Agent, or Firm*—Burns, Doane, Swecker & Mathis

[57] ABSTRACT

A method for co-generation of electrical power and air conditioning for structures, such as office buildings, and housing units is disclosed. An internal combustion engine, preferably a diesel, drives an alternator or generator to supply the building electrical load or for reverse sale to a public utility power grid. Heat from engine exhaust gases is recovered by an absorption-cycle heatpump system. The system is characterized by using only a single external heat exchanger and a single building air conditioning heat exchanger for selectively heating or cooling air in the air conditioning system. Selection of heating or cooling is by reversable valve means for directing heated refrigerant vapor from a heat powered vapor generator either into the inside heat exchanger for heating or to the external heat exchanger for cooling. The valve means simultaneously converts the other heat exchanger to complimentarily receive liquid refrigerant passing through an expansion valve from the first heat exchanger to absorb heat from the air conditioner for cooling, or from the atmosphere for heating. A particular advantage of this arrangement is reduction in both size and complexity of the vapor generation system to satisfy a wide range of loads because control of heat and liquid circulation rate of carrier liquid alone determine "compression" capacity as distinguished from mechanical pumping capacity of vapor compressor heat pumps. Additionally, the absorption cycle permits handling of mixtures of vapor and liquid phases of the refrigerant component without loss of effectiveness, which is likewise not possible with vapor-compression heat pump systems.

8 Claims, 3 Drawing Figures

METHOD AND APPARATUS FOR CO-GENERATION OF ELECTRICAL POWER AND ABSORPTION-TYPE HEAT PUMP AIR CONDITIONING

FIELD OF THE INVENTION

The present invention relates to co-generation of electrical power and air conditioning for buildings. More particularly, it relates to energy efficient methods of, and apparatus for, generating electrical power by directly driving an electrical alternator or generator with an internal combustion engine and recovering heat from the exhaust gases, or other output, of the engine to drive an absorption-type heat pump, or reversible refrigerating-heating unit.

It is a particular object of the invention to provide a highly efficient co-generation system for generating both electrical power and either heating or cooling of air for a living or business building complex using fewer and more effective heat exchange units. Specifically, in accordance with my invention, such air is heated or cooled by only a pair of heat exchange units, operating selectively either as a vapor condenser for radiating heat or as an evaporator for absorbing heat, as integral elements of an absorption-type refrigeration system. Such absorption-type refrigeration system is powered by heat recovered from operation of an internal combustion engine directly driving an electrical alternator or generator to supply electrical power to the building electrical distribution system. The distribution system may, of course, include electric motors to drive air circulation blowers and pumps to provide circulation of liquid refrigerant in the absorption system (hereafter also referred to as an absorption heat pump). (Excess, locally generated, electrical power in many states may now be connected to public utility distribution lines for sale to a central power grid.) Preferably, the internal combustion engine is a Diesel-cycle engine operating to generate exhaust gases at temperatures of from about 500° F. to 1,200° F. Such gases are an efficient heat source for a vapor generator of the absorption heat pump. The heat pump vapor generator evaporates the refrigerant portion (e.g., ammonia or lithium bromide) at an elevated pressure from the refrigerant enriched two component (e.g., ammonia or lithium bromide in water solution) fluid flowing through it. The resultant vapor then in response to temperature in the enclosed space selectively flows to one of the two heat exchangers for condensation and release of heat. This is either to the atmosphere, external to the building (or for other service) or into the building air conditioning. Selection of such flow is by valve means, desirably automatically operated in accordance with the temperature requirements of the building. The valve means also simultaneously controls connection of the other heat exchanger through expansion valve means to the first heat exchanger so that the second heat exchanger will serve as an evaporator. In this way the refrigerant liquid aborbs heat from the air conditioning system, or from the atmosphere external to the building. The selector valve means likewise controls flow from such second, or other, heat exchanger (serving as the evaporator) back to the absorption system vapor generator through an absorber. The latter, of course, functions to reabsorb, at reduced pressure, refrigerant vapor from the evaporator heat exchanger back into the carrier fluid component of the absorption system. Pressure reduction from the condenser to the evaporator, through such expansion valve means, is desirably pressure-responsive to control the direction of flow between the two heat exchangers. By use of only two interchangeable heat exchangers under control of building temperature conditions, a fuel efficient and rapidly responsive air conditioning system is fully integrated with electrical service for efficient co-generation of building power requirements.

PRIOR ART

Co-generation of electrical power and building heat or air cooling has been proposed heretofore, but has not been considered practical for individual buildings, even those having large power demands such as, high rise office or apartments. Primarily this has been due to inherent inefficiencies of conventional heat pump units operating on compressor energized, single-fluid, vapor-compression-expansion cycles, to produce reversible refrigeration.

Among such prior known systems, an engine may drive an electrical generator to generate electrical power with a part of the electrical power being used to drive a compressor motor for a vapor compression heat pump system. U.S. Pat. No. 4,065,055—De Cosimo discloses such a system of co-generation.

U.S. Pat. No. 4,093,868—Manning, discloses a system in which a steam turbine drives an electrical generator and recovered steam condensate from the turbine is used to improve the low efficiency of a normal vapor-compression heat-pump system. The system, is particularly directed to the problem of condensing compressed vapor to heat a building when the ambient outdoor temperature of air or water is too low for effective absorption of heat from the evaporator, as in winter.

U.S. Pat. No. 3,259,317—Aronson et al. is also directed to a vapor-compression heat-pump system for cooling building air in summer where small temperature differences are available across the condenser due to high ambient temperatures, and the electric lighting load is low because of longer days. In such a system the engine is mechanically loaded to produce more heat by driving either an external pump for circulating liquid to a hydraulic fan motor or wasted by friction in a variable load brake.

U.S. Pat. No. 2,130,606—Wanamaker also discloses a vapor compression space cooling system driven by a diesel engine either directly or through an electrical generator driven by the engine. A separate space heating system uses heat recovered directly from the engine. U.S. Pat. No. 2,181,053—Hamilton is similar, but uses the generated electric power for space heating. U.S. Pat. No. 4,010,378—Tharp et al. disclose the use of a rotary vapor expander driven by an external heat source in the form of a vapor generator. The expander drives an electrical generator and a vapor compressor for air cooling. Air heating is by recovery of heat from the rotary expander.

Systems for co-generation of electricity and space conditioning by heat recovery alone from either internal or external combustion engine are disclosed in U.S. Pat. Nos. 4,164,660—Palazzetti; 4,150,300—Van Winkle; 3,678,284—Peters; 3,944,837—Meyers et al. The Peters and Meyers et al. patents also suggest that such recovered heat can alternatively be used to operate an absorption cycle or steam jet cycle refrigeration system for air cooling.

U.S. Pat. No. 3,858,802—Stobart is directed to space heating by heat recovery from both a Sterling-cycle engine and a heat pump driven by the engine. Heat-pump cooling is also used to cool the engine working fluid.

U.S. Pat. No. 3,805,540—Schwartzman discloses a co-generation system driven by an internal combustion engine to generate electric power and heating or cooling of two separate coils in an air conditioning circulating system. For heating, heat is recovered by a heat exchanger fluid from the engine exhaust gases and the heated fluid is circulated through one of the two coils. For cooling, the heated fluid operates a separate absorption-cycle refrigeration system, or preferably, a special power-cycle, refrigeration system which uses a single working fluid to drive a compressor through a rotary turbine. The rotary turbine is driven by heat recovered from the electrical generator-internal combustion engine combination. To increase engine exhaust heat, the electrical system connected to the generator is loaded by a blower motor or electrical resistance.

As particularly distinguished from the foregoing systems, the present invention provides a co-generation method of using an internal combustion engine, preferably a diesel, to mechanically drive an electrical generator and heat recovered from the engine directly and efficiently heats and compresses refrigerant in an absorption-type heat-pump selectively to heat or cool building air space. Such efficiency is achieved by selectively flowing the heated refrigerant component of the two fluid absorption-type refrigeration system either to heat or to cool a single heat exchanger means disposed in the air circulation system for the building. Selection of such flow is, of course, in accordance with a temperature to be maintained in the building or air space.

The direction of flow of such directly heated refrigerant vapor from the absorption-type pressure generator through such heat exchange means is controlled by selector valve means. For air heating in the building, the valve means directly flows heated vapor to the single heat exchanger in the building air conditioning system. Heat is transferred to building air and condenses the vapor. For air cooling, heated vapor is conducted to another single heat exchanger means disposed external to the building for condensation at ambient conditions by air or water cooling. The valve means in either case simultaneously connects the outlet from the air conditioning heat exchange means either for heating, through expansion valve means to the external heat exchanger, or for cooling, from the external heat exchanger to the air conditioning heat exchanger through expansion valve means. The expansion valve means desirably is pressure responsive to control automatically flow of condensed refrigerant liquid at high pressure to the correct heat exchange means for heat absorption, either from the air conditioning system or from an external source, such as the atmosphere.

A particular advantage of the present arrangement is the ability of the heat pump system to run at maximum efficiency for heating even when the ambient exterior temperature is low. As discussed in the above-noted patents, such conditions are quite unfavorable to heat pumps using mechanical vapor compression cycles because in winter temperature difference between fluid flowing in the exterior heat exchanger and ambient air or water is small. Thus, the total heat transfer is small. This is primarily due to the fact that compressors in such systems do not operate effectively on liquids or mixtures of liquid and vapor. Accordingly, only vapor can be compressed. This greatly reduces the quantity of refrigerant that can be handled, namely, the amount that can be evaporated or expanded over restricted low temperature ranges.

On the other hand, with an absorption-type heat pump, the generator is exclusively heat and liquid pump actuated and refrigerant vapor is evolved from an enriched solution of such refrigerant and the carrier liquid. There is, accordingly, no limitation on flow of refrigerant in vapor, liquid or mixed phases, since pumping is done on the carrier liquid only. Further, in the method of the present invention, the temperature of the exhaust gas from the internal combustion engine is desirably kept high. In a preferred embodiment, the engine is a Diesel operating to produce gases having a temperature of from about 500° F. to 1200° F. so that a relatively high temperature heat energy is available to drive the absorption generator for evolution of refrigerant vapors, whether in hot, or cold, weather.

Of even greater significance, is the ability of such system to operate efficiently when exterior temperature is high, requiring large amounts of air cooling, as in summer, and the electrical load is down. To achieve adequate cooling with a vapor compression cycle, at high load, it is necessary to oversize the compressor to assure adequate condensate from vapor flowing at high temperature to an external heat exchanger when ambient temperature is also high. Cost and efficiency of such compressors under less than high load conditions are not favorable for economical use of such a system as a heat pump. However, with an absorption-type heat-pump system, higher refrigerant flow rates are obtained solely by adding more heat, and if desired, slightly higher carrier liquid pumping rates. Thus, a part of any required heat can be supplied by further heat recovery from engine work, such as from the engine cooling system for water or lubricant, or by partial conversion to heat of the electrical power being co-generated. The electrical power may also be used to increase forced air flow or increased heat pump liquid flow.

Further objects and advantages of the present invention will become apparent from the following description of preferred embodiments taken in conjunction with the accompanying drawing.

DETAILED DESCRIPTION OF PREFERRED EMBODIMENTS

Figure 1:
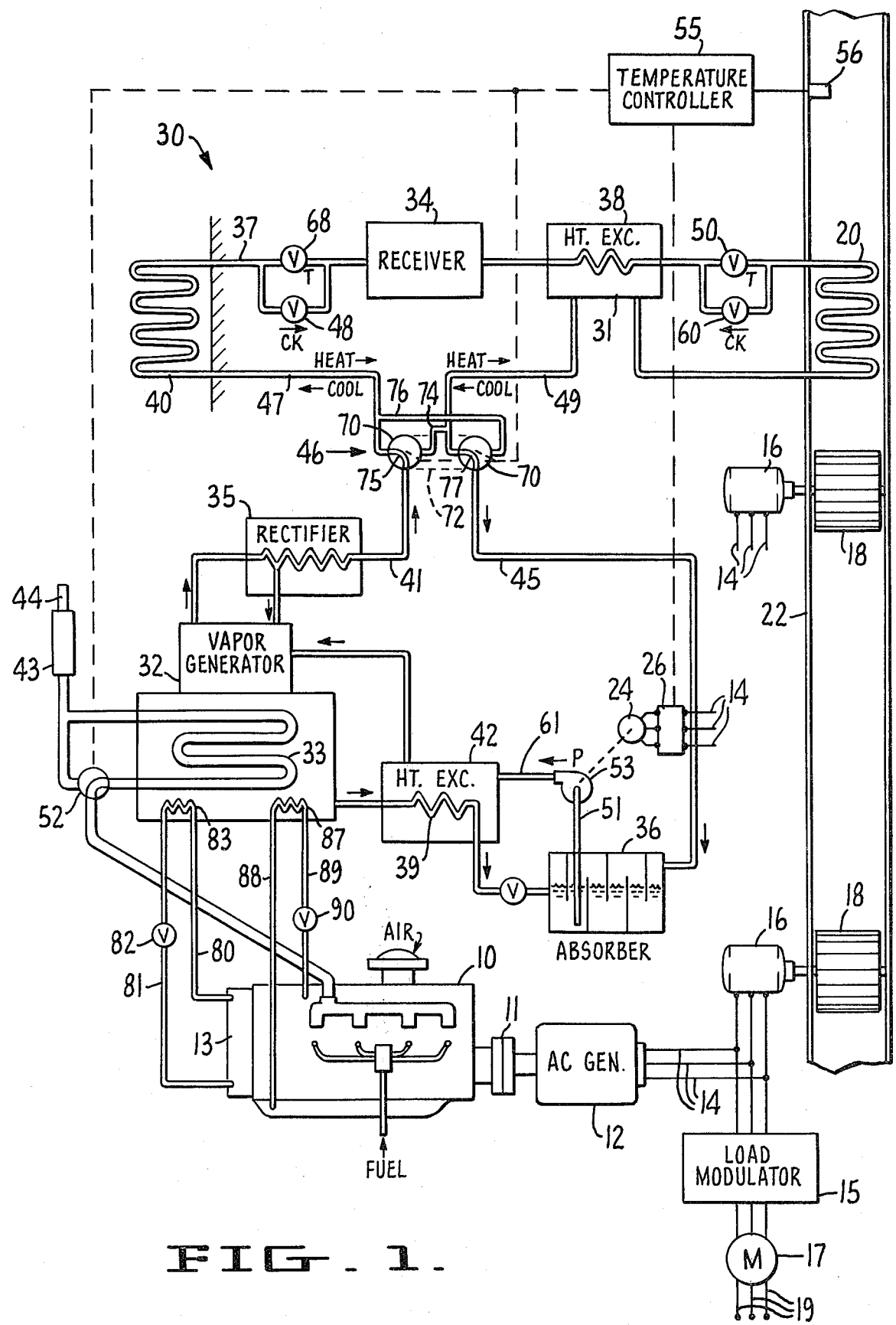
FIG. 1 is a schematic representation of a co-generation system for local production of electrical energy and air conditioning using an absorption-type heat pump unit for either heating or cooling air.

Referring now to the drawings, FIG. 1 shows schematically a preferred arrangement for practicing the method of the present invention. The co-generation system is driven by an internal combustion engine 10, which preferably operates on a Diesel cycle. Engine 10 is mechanically directly coupled by coupler 11 to an electrical generator, or alternator 12. Electrical power from alternator 12 may be supplied by lines 14 to a local building. For example, an apartment house, a large industrial or an office building, may advantageously supply its own electrical power requirements, and under low-load conditions may now, in many geographical areas, sell excess electrical power to public utility system through reverse current meters. Desirably the alternator is a conventional three-phase, alternating current generator. Alternatively, the generator may produce direct current which through solid state circuitry may be converted to alternating current. While the electrical power may supply general building electrical load, a particular load generally will include drive of fan or blower motors 16 to circulate air in the building air conditioning system. A specific advantage of driving blowers 18 through motors 16 is that the load applied to engine 10 by such motors is directly related to the need for air heating or cooling by heat exchanger 20 located in the building air condition duct system 22.

As shown in FIG. 1, an absorption-cycle heat pump system is generally indicated as 30. System 30 basically includes a vapor generator 32, a rectifier 35, and an absorber 36 as well as heat exchangers, or coils 20 and 40 which serve selectively as a condensor or an evaporator as required for heating or cooling of air in duct 22. The system is partially pressurized by circulating pump 53 returning enriched carrier liquid from absorber 36 to vapor generator 32. Pump 53 is driven by motor 24 also supplied by power lines 14 through motor speed regulator 26. For economy, the system also includes heat exchangers 38 and 42 to conserve thermal energy in the evaporation and condensation of the refrigerant component from the two phase fluid system.

In the present embodiment, high pressure refrigerant vapor is evaporated from a saturated, or refrigerant enriched, liquid in vapor generator 32. The output of generator 32 is entirely dependent upon the initial pressure of the system as supplied by pump 53 and the amount of heat supplied to it. As shown, coil 33 in generator 32 is a heat exchanger for exhaust gases recovered from engine 10. Exhaust gas is released through muffler 43 and stack, or vent pipe, 44.

If desired, additional heat can be supplied to generator 32 by recovering heat from the engine either by flowing engine coolant or engine lubricating oil through vapor generator 32 as shown, or heat exchanger 42 (not shown). Additionally, electrical heat may be used such as by resistance heaters connected to the co-generated electric power system. Heat is also available from liquid cooling of electrical generator 12, if desired.

Control of flow of the vapor from generator 32 to obtain either heating or cooling from air conditioning coil 20 is through selector valve means 46. In a preferred form valve 46 may be automatically actuated by temperature controller 55. It may, of course, also be actuated manually. The amount of heat supplied to generator 32 may also be controlled by controller 55, responsive to desired space temperature, as sensed by thermostat 56. For such control, diverter valve 52 may also be actuated by controller 55 to bypass a part of the exhaust gas from engine 10 directly to muffler 43 and stack 44. Temperature controller 55 may also regulate the flow rate of carrier liquid through speed controller 26 and pump motor 24. Flow rate of carrier liquid through vapor generator 32, heat exchanger 42 and absorber 36 wil, of course, also control or regulate the rate of evolution and in part the pressure vapor from vapor generator 32.

Figure 2:
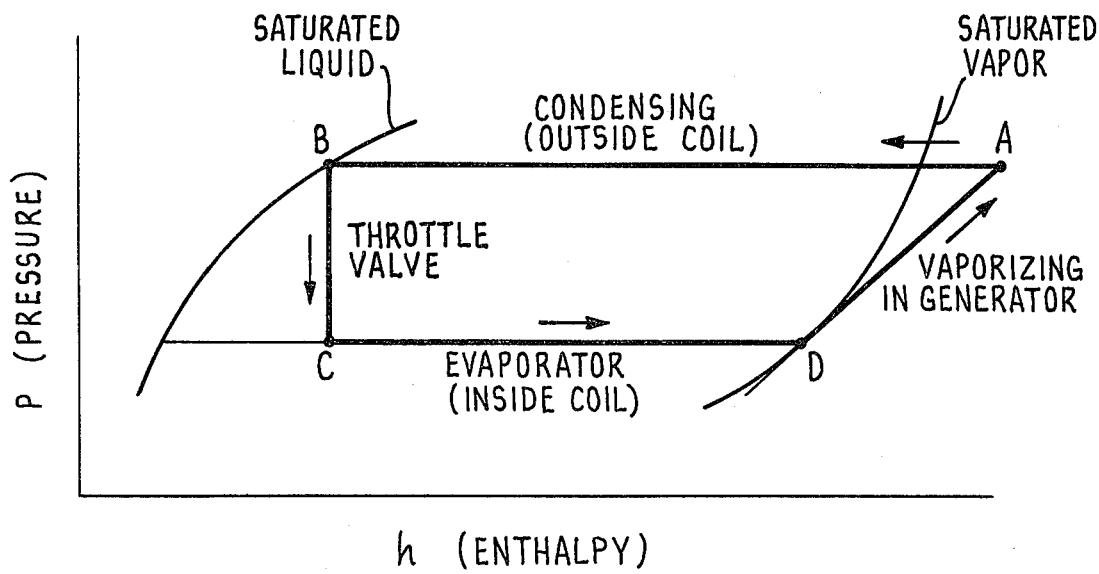
FIG. 2 is a Mollier diagram of pressure-versus-enthalpy (heat content) of the refrigerant component flowing through the system of FIG. 1 with the single heat exchanger in the air conditioning system connected as a heat absorber to cool air.

Heating of vapor in generator 32, of course, raises the pressure of the vapor which is released from the pressurized liquid-gas mixture. In FIG. 2 this is represented by point A on the Mollier diagram of pressure vs. enthalpy (heat content) of the refrigerant vapor. It will be understood that the higher the temperature of vapor leaving generator 32, the greater the values of both pressure and enthalpy of point A. Correspondingly, the greater the total area enclosed by cycle diagram A-B-C-D, the greater the total work available from the compression-expansion cycle. For the cooling cycle represented in FIG. 2, heat is extracted from the refrigerant vapor to condense it to liquid at substantially constant high pressure as represented by point B. Such flow of the vapor is through rectifier 35 and, as selected by valve 46, to outside coil, or heat exchanger 40. Rectifier 35 permits efficient separation of carrier fluid from refrigerant vapors in the absorption-cycle heat pump system, so that vapor flow to the condenser, such as heat exchanger coil 40 is substantially all working fluid. Flow to coil 40 from rectifier 35 is through lines 41 and 47 and passageway 75 of valve 46.

Condensed vapor, substantially all liquid, then passes from heat exchanger 40 to receiver 34 through check valve 48 for storage or direct flow (depending upon system demand) through heat exchanger 38 and then to expansion valve 50. Heat exchanger 38 assists in further reducing the enthalpy of refrigerant from condenser 40 and receiver 34.

Expansion or throttle valve 50 initiates cooling or heat absorption in coil 20 by reducing pressure on the refrigerant. This is indicated in FIG. 2 as the change of state from B to C. Reduction in pressure of the refrigerant liquid permits the refrigerant to vaporize at the lower pressure and thereby absorb heat. Heat is absorbed from air flowing over coil 20 at such reduced pressure. This is represented by the line C-D in FIG. 2. Return of the warmed low pressure vapor to vapor generator 32 is through absorber 36 and heat exchangers 38 and 42. Such return from single heat exchange coil 20 to absorber 36 is controlled by selector valve means 46. With coil 20 arranged to cool, return of the low pressure, expanded vapor is through lines 45 and 49 and passageway 77 of valve 46.

In the absorption-cycle heat pump system of the present embodiment, pump 53 circulates the liquid carrier component (e.g. water) for the refrigerant fluid (e.g. ammonia or lithium bromide) primarily through generator 32, absorber 36 and heat exchanger 42. In such a circuit, as shown in FIG. 1, the expanded and warmed gas from cooling coil 20 is absorbed into a weak solution of refrigerant in the carrier fluid (e.g., ammonia or lithium bromide in water) to create an enriched solution. The weak solution results from depletion of the refrigerant component from the enriched solution that is "boiled" off in vapor generator 32. The hot weak solution is cooled in heat exchanger 42 by flow through coil 39 to heat exchange with the cooler enriched solution then being regenerated in absorber 36. The enriched solution is at the same time warmed in heat exchanger 42 as it is pumped from absorber 36 to generator 32 through heat exchanger 42 by pump 53 and lines 51 and 61. Enriched liquid from heat exchanger 42 is then pressurized by pump 53 to flow into the upper portion of vapor generator 32 through line 62 for extraction of refrigerant vapor. Heating of such enriched liquid further to raise its pressure in vapor generator 32 is represented by line D—A in FIG. 2.

As shown in the arrangement of FIG. 1, solely by operation of valve means 46 the heat pump system is converted from cooling to heating air in the air conditioning system represented by duct 22, blower 18 and heat exchanger 20. It will be noted that for air heating valve 46 also reconnects heat exchanger 40 so that it now becomes the cooling, or heat absorption coil. Further expansion in valve 50 is by-passed by check valve 60 connected in parallel thereto so that no mechanical change in expansion valve 50 is required. In this way cooled vapor passes freely through heat exchanger 38 to receiver 34 in response to refrigerant pressure alone.

Figure 3:
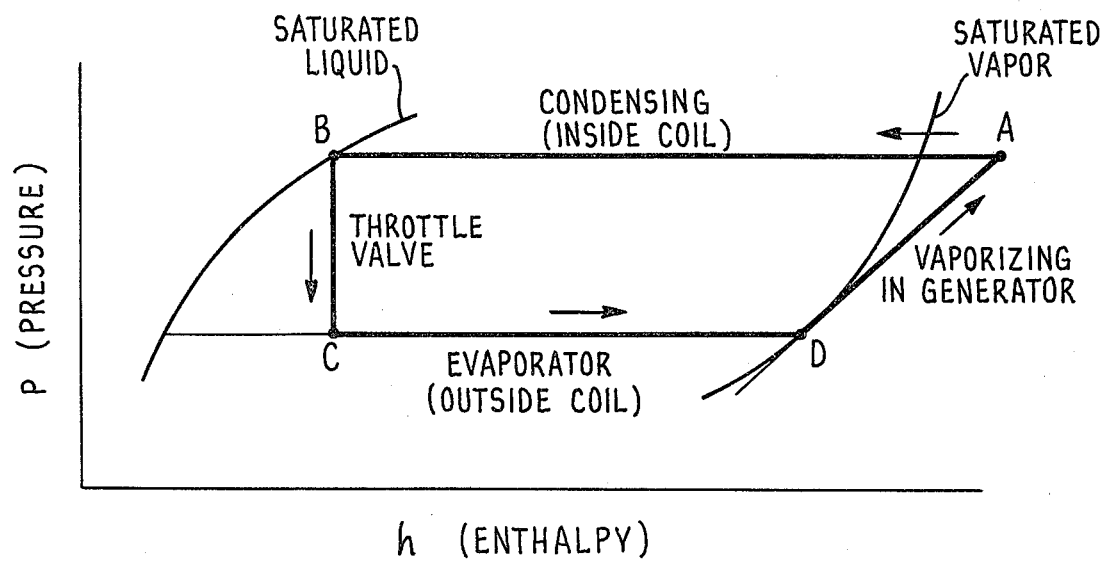
FIG. 3 is a Mollier diagram similar to FIG. 2, of pressure-versus-enthalpy of the refrigerant component flowing through the heat pump system of FIG. 1 using the single heat exchanger as a condenser to heat air in the air conditioning system.

In FIG. 3, the Mollier diagram illustrates operation of the arrangement of FIG. 1 to heat inside, or air conditioner, heat exchanger 20. In this diagram, point A (as in FIG. 2) is the source pressure and enthalpy for heated vapor out of vapor generator 32. For flow from A to B, vapor from generator 32 flows through rectifier 35 and by line 41 to the shell 31 of heat exchanger 38 and then to coil 20. Control of such flow is by rotation of rotor 70 of valve 46 to connect passageway 75 to line 74. Condensed vapor then flows to expansion valve 68 from coil 20 through check valve 60 (to by-pass throttle valve 50) the coil of heat exchanger 38 and receiver 34. Flow of liquid from B to C is through expansion, or throttle, valve 68 to heat absorption, or cooling coil 40. Check valve 48 in parallel with throttle valve 68 prevents flow from receiver 34 to line 37 except through valve 68.

Selector valve 46 also controls return of the refrigerant expanded at substantially constant pressure in coil 40 to absorber 36 through lines 47 and 45 by way of line 76, and passageway 77 of valve 46. This is indicated in FIG. 3 by line C-D. As in the cooling cycle represented in FIG. 2, heat and pressure are then supplied to the refrigerant component by vapor generator 32, as indicated by line D-A.

Valve means 46 may be a plurality of mechanically interconnected valves to reverse connections of coils 20 and 40 for cooling or heating. However, as indicated in the drawings, desirably it is a rotatable metal rotor body 70 within a cylinder 72. Rotor body 70 includes channels 75 and 77 which permit line 41 from rectifier 35 and line 45 to absorber 36 to be simultaneously switched or exchanged either to line 47 going to outside heat exchanger 40 or line 49 leading to inside heat exchanger 20. By forming body 70 of metal, some additional heat exchange can be effected by flow through valve 46. Recovery of heat from fluid in line 41 from rectifier 35 assists in further warming of vapor returning from the colder expansion coil to absorber 36. Similarly, the cooler vapor returning from the expansion coil assists in condensing high pressure vapor flowing to the condenser coil.

In operation of the system in accordance with the present invention, as discussed above, it is advantageous to operate engine 10 so that the exhaust gases passing through coil 33 are as hot as possible. For this reason, engine 10 desirably operates on a diesel cycle and the exhaust gas temperature is controlled to be in the range of from 500° F. to 1200° F. Additional heat of about 200° F. is also available from heater coil 83 in generator 32 supplied by lines 80 and 81, as controlled by valve 82, to use engine cooling fluid from radiator 13 of engine 10. Similarly, heat from the engine lubricant system may be recovered in heater coil 87 supplied by lines 88 and 89 through valve 90. Alternatively, coils 83 and 87 may be located in the shell of heat exchanger 42 to preheat saturated fluid from absorber 36 flowing to vapor generator 32.

The temperature range of the exhaust gas may, of course, be more closely controlled by modulating the load applied to electrical generator, or alternator 12 by power lines 14. As indicated, a load modulator 15 may control supply of power to a public utility grid, represented by lines 19, through meter 17.

From the foregoing it will be seen that the present invention provides a co-generation system in which an absorption-type heat pump system easily and efficiently interchanges flow of working fluid to cool or heat a building air conditioning system. The outstanding characteristic of such system is its ability to supply efficiently a greater range of air conditioning loads than heretofore possible without use of multiple heat exchangers and with the higher reliability and lower maintenance costs of an absorption cycle, as distinguished from a vapor-compression cycle, system. Further, the absorption system can be designed to meet a wide range of loads, such as a few tons for a single family home, to several hundred tons, as required by multiple buildings or high rise structures. Additionally, a wide range of loads for either heating or cooling can be accommodated. For example, to cool in hot weather, an increase in heat to the generator will assure adequate temperature difference across outside coil 40, but if it does not, some vapor can be tolerated through receiver 34, heat exchanger 38 and expansion valve 50. Similarly, in cold weather, when the temperature difference between ambient and expanding liquid in external coil 40 is small, the returning fluid to absorber 36 will tolerate liquid as well as vapor.

My invention is particularly distinguished from vapor-compression cycle heat pump systems which requires converting heat to mechanical work (by an internal combustion engine) and then conversion of mechanical work by a compressor to compress and heat refrigerant vapor. The present system uses waste heat directly to evaporate gas from a liquid and a liquid pump to circulate and pressurize the carrier fluid only. Thus, the compression work is done by a liquid pump and heat which are more economical than solely by a compressor alone. In particular, the mechanically actuated liquid pump need only supply from about 1/10 to ⅓ of the power required for the applied heat load as distinguished from a vapor compression system which requires full mechanical pumping.

While only a single embodiment of the present invention has been illustrated and described, various modifications and changes in the method, and apparatus for carrying it out, will be apparent to those skilled in the art. All such modifications or changes coming within the scope of the appended claims are intended to be included therein.

I claim:

1. Method of simultaneously supplying electrical power and thermal energy to local energy conversion units which comprises operating an internal combustion engine to mechanically drive an electrical generator, said generator being electrically connected to a system adapted to modulate said load to hold the temperature of the engine exhaust gas within a range of from about 500° F. to about 1200° F., flowing said exhaust gas from said engine through a vapor generator of an absorption-type refrigeration system to heat and increase the pressure of vapor from the refrigerant component of the operating fluid in said system, selectively extracting the heat from said vapor by condensing it at substantially constant pressure to a substantially liquid state by selectively flowing said vapor either through a heat exchanger exposed to outside air for ambient air cooling of said vapor or to a heat exchanger exposed to air flow in a local air heating system, simultaneously flowing the resultant condensed refrigerant liquid from the selected heat exchanger through an expansion valve to the other of said heat exchangers for reduction of the pressure of said liquid flowing therethrough to absorb heat from air flow over said other heat exchanger, and returning the expanded resultant refrigerant vapor at such reduced pressure to said vapor generator through an absorber for solution in the carrier liquid withdrawn from said vapor generator after said refrigerant vapor is extracted, and compressing by heat the evaporated refrigerant by passing said exhaust gas from said internal combustion engine through said vapor generator.

2. Method of co-generation of electrical and thermal energy for local supply of electrical power and space air conditioning requirements which comprises, operating a Diesel engine at a load sufficient to create heated exhaust gas to a range of temperatures of from about 500° F. to about 1200° F., said load including mechanically driving an electrical generator with said engine, said generator being electrically connected to a system adapted to modulate said load to hold said gas temperature within said range, flowing said heated exhaust gas from said engine through a vapor generator of an absorption-type refrigeration system to extract the refrigerant component as a vapor from the liquid carrier phase of said system, and thereby to heat and increase the pressure of the vapor phase of said refrigerant component, flowing said vapor phase to a condenser to form a high pressure liquid phase of said condensed vapor, restricting the flow of said liquid phase into an evaporator to re-expand said liquid phase into a vapor phase by absorption of heat, and from said evaporator coil into an absorber for resolution of said vapor into said liquid carrier phase for return circulation of the combined liquid to said vapor generator, said flow between said condenser and said evaporator coil being controlled in response to a preselectable temperature of space air to be temperature conditioned which includes controlling the direction of flow of heated vapor from said vapor generator through a selected one of a pair of heat exchangers adapted to serve as either said condenser or said evaporator, said pair of heat exchangers being respectively located (a) in the space air conditioning system for heat exchange with air flowing therethrough and (b) external to said space for heat exchange with ambient air, simultaneously restricting flow of said liquid phase from said one heat exchanger to the other heat exchanger of said pair to serve as said evaporator for return flow to said absorber whereby selection of the direction of flow of said refrigerant alone converts a space air conditioning system from heating to cooling and vice versa in response to said preselectable temperature of said space.

3. Method for co-generation of electrical power and space heating or cooling for utility service to a building complex which comprises operating an internal combustion engine to mechanically drive an electrical generator, said generator being electrically connected to the electrical distribution system for said building complex, recovering heat rejected by said engine in a vapor generator of an absorption-type refrigeration system to increase the pressure of the vaporizable refrigerant component of said absorption circulating system, condensing such vapor component by cooling said refrigerant at substantially constant pressure to a liquid, said vapor component being cooled in response to a preselected temperature range to cool or heat space in said building complex, which includes selectively directing said vapor flow either through a coil exposed to outside air for cooling or to a coil in an air flow duct for heating said building space, absorbing heat from the resultant condensed liquid refrigerant by flowing said liquid to the other of said coils from said one coil through pressure reducing means, and returning the resulting vaporized refrigerant at such reduced pressure to said vapor generator through an absorber for resolution of said vapor in the liquid carrier component of said absorption circulation system for regeneration of said refrigerant vapor component by heat absorbed in said vapor generator from said internal combustion engine.

4. Apparatus for co-generation of electrical power and air conditioning requirements of a building which comprises a Diesel engine, an electrical generator driven by said engine, means connecting the electrical energy output of said generator to the distribution system for said building, heat recovery means connected to the exhaust system of said Diesel engine, said heat recovery means including a heat exchanger in a vapor generator adapted to vaporize the refrigerant component from a concentrated solution of refrigerant and liquid carrier in said vapor generator of an absorption-type heat pump, valve means for directing the refrigerant vapor from said vapor generator to either a heat exchanger positioned external to said building or to a heat exchanger disposed in the air conditioning system of said building, said valve means additionally including means for simultaneously connecting the other of said heat exchangers not then connected to said vapor generator to the vapor absorber of said heat pump to complete flow of refrigerant through both of said heat exchangers, and expansion valve means in fluid circuit between said external and said air conditioning heat exchangers, said expansion valve means being responsive to a pressure difference between said heat exchangers to control flow of condensed liquid from the one of said heat exchangers selected for flow of vapor from said vapor generator to said other heat exchanger for heat absorption by liquid therein either from the atmosphere external to said building for heating of said building air or from said air conditioning system for cooling of said building air.

5. Apparatus for co-generation of electrical power and air conditioning requirements of a building which comprises a Diesel engine, an electrical generator driven by said engine, means connecting the electrical energy output of said generator to the electrical distribution system for said building, heat recovery means connected to the exhaust system of said Diesel engine, said heat recovery means including an absorption-type heat pump vapor generator means adapted to vaporize the refrigerant component from a concentrated solution of refrigerant in a liquid carrier, first conduit means connected to outlet means from said vapor generator, valve means in said first conduit means, first heat exchange means positioned external to said building, second heat exchange means disposed in the air conditioning system of said building, said valve means including means for connecting said first conduit to conductor means connected either to said first or said second heat exchange means, said valve means additionally including means for simultaneously connecting the other of said first or said second heat exchange means to vapor absorber means of said absorption-type heat pump to complete flow of said refrigerant component back to said vapor generator after traversing both of said heat exchange means and said absorber means, and expansion valve means in fluid circuit between said first and said second heat exchange means, the direction of flow through said expansion valve means being in response to the pressure difference between said first and said second heat exchange means, whereby said refrigerant component flowing in said second heat exchange means may provide either heating or cooling to said building air conditioning system, and simultaneously said refrigerant component flowing in said first heat exchanger respectively rejects heat to or absorbs heat from ambient external air.

6. A method of simultaneously generating electrical power and thermal energy to heat and cool an enclosed area to maintain a preselected temperature therein, which comprises operating an internal combustion engine at a load sufficient to generate exhaust gas having a temperature within a range of from about 500° F. to about 1200° F. and mechanically drive an electrical generator, said electrical generator being connected to an electric power system adapted to modulate said load to hold said gas temperature within said range, flowing said exhaust gas from said engine through a vapor generator of an absorption-type refrigeration system to heat and increase the pressure of the vapor which is essentially the refrigerant component of the working fluid of said system, selectively extracting heat from said vapor by condensing said refrigerant at substantially constant pressure to a substantially liquid state by flowing selectively said vapor either through a heat exchanger exposed to outside air for ambient air cooling of said vapor or to a heat exhanger exposed to air flow in said enclosed area, simultaneously flowing the resultant refrigerant liquid through expansion means to the unselected other of said heat exchangers for reduction of the pressure of said liquid flowing therethrough to absorb heat from air flow over said unselected heat exchanger, and returning the resultant refrigerant vapor at such reduced pressure to said vapor generator which includes flowing said vapor through an absorber for solution in the carrier liquid withdrawn from said vapor generator after vaporization therefrom of said refrigerant vapor, and pumping said carrier liquid at an elevated pressure from said absorber to said vapor generator.

7. Method in accordance with claim 3 wherein said heat is recovered from exhaust gases from said engine and additional heat is obtained from one or more other sources including engine coolant, engine lubricant and energy conversion means driven by said engine.

8. The method in accordance with claim 3 wherein the rate of vapor evolution within said vapor generator is controlled by regulation of at least one condition in said absorption refrigeration system including carrier liquid flow rate and heat flow to said vapor generator.

* * * * *

UNITED STATES PATENT AND TRADEMARK OFFICE
CERTIFICATE OF CORRECTION

PATENT NO. : 4,380,909

DATED : April 26, 1983

INVENTOR(S) : Harry M. Sung

It is certified that error appears in the above-identified patent and that said Letters Patent is hereby corrected as shown below:

Column 6, line 64, before "solution" should read -- liquid --.

Signed and Sealed this

Twentieth Day of September 1983

[SEAL]

Attest:

GERALD J. MOSSINGHOFF

Attesting Officer

Commissioner of Patents and Trademarks